നമ2,942,995

COATING COMPOSITION

Nathan B. Hughes, 5805 Ruatan St., Berwyn Heights, Md.

No Drawing. Filed Mar. 11, 1958, Ser. No. 720,530

3 Claims. (Cl. 106—224)

The present application is a continuation-in-part of my copending application Serial No. 521,881, filed July 13, 1955, now Patent No. 2,855,323, issued October 7, 1958, which, in turn, is a continuation-in-part of my application Serial No. 325,697, filed December 2, 1952, now abandoned.

One of the objects of my invention is the production of a liquid protective coating to be applied to automobiles and other surfaces for which the coating is adaptable, for the purpose of presenting the original finish against normal wear, to restore its luster, and to protect against further wear surfaces already somewhat worn and dulled.

It is a further object of my present invention to provide a liquid coating composition which, when applied as an undercoating to plates formed of plastic materials, such as Vinylite or Mylar (which are understood to be a copolymer of vinyl chloride and vinyl acetate, and a polyethylene terephthalate resin, respectively) used in lithography for the production of negatives, will confer great dimensional stability to said negatives. Thus, a particular object of my invention resides in a method for increasing the dimensional stability of plastic negative plates by providing them with a coating of liquid composition of the present invention. The invention likewise comprehends plastic plates produced by such method.

Other objects and advantages of my invention will become apparent in the course of the following detailed description.

The improved liquid coating composiiton of my invention consists of a mixture of the following ingredients, the preferred proportions being as indicated:

| | |
|---|---|
| Castor oil | ¼ ounce (4 grams). |
| Benzol | ½ ounce. |
| Beeswax | ½ ounce (225 grains). |
| Turpentine (redistilled) | 12 ounces. |
| Varnish (preferably Valspar) | One part to two parts of above mixture. |

To prepare the composition for use, proceed as follows:

Dissolve the beeswax in the heated turpentine; dissolve the castor oil in the benzol and mix the two solutions to blend thoroughly; then, add two parts of blended solutions to one part varnish.

To apply the coating composition to automobile and like surfaces: Clean and dry the surface to be protected. Thereafter, apply the above described composition with a brush or a cloth to the dry clean surface, one section at a time. After the coating has set for a few minutes, wipe the coated surface until smooth and dry.

The above proportions may be varied according to the protection desired and the surface to be protected.

My composition is a thin liquid which may be applied in one or more layers as desired, to form a transparent coating. It is not a polish, although it will have a hard, glossy finish when applied.

The liquid protective coating of the present invention has the durability of a lacquered surface, is simple to apply and is comparatively inexpensive.

The same composition when used in the same approximate proportions, but excluding the varnish, produces a polish which can also be used for the same purposes; however, it is less durable.

As disclosed above, my liquid coating preparation includes a varnish which, as defined in U.S. Patent No. 1,459,581 to Draper, issued June 19, 1923 (page 1, lines 25–35), is a composition having as its essentials a resinous matter or gum, such as rosin, copal, or the like, dissolved in a suitable vehicle, such as boiled linseed oil. Draper further states that varnish compositions can be "of the water or weather-proof variety of which a number are well known and on the market, one commercial product of this kind being that known as 'Valspar' varnish." As brought out above, I preferably use in the preparation of my coating composition a Valspar varnish. One particular Valspar varnish which I have successfuly used is the one sold under the name of "Super Valspar," a clear gloss varnish which is stated to comprise 50% soya ester gum alkyd resin and 50% petroleum thinner. However, any other high-grade commercial varnish composition can be used for the purposes of the present invention.

As mentioned, I have further discovered that the composition described above is also valuable in the preparation of dimensionally stable plastic plates, such as are used in lithographic work. In the art of lithography, sheets or plates of plastic, such as Vinylite or Mylar, are employed which are carefully coated, i.e. "stained," with an opaque surfacing material. One available commercial surfacing material employed for such staining purpose is identified as "Flopaque." All such materials form an opaque colored coating when applied to the surface of the sheet. In the preparation of negatives for lithographic work, an image of the material to be reproduced is photographed on the surface of the coated plate described above, and the engraver then engraves the outline of the image on such prepared surface by means of a suitable engraving tool. The resulting sheet having opaque and transparent portions then becomes the negative which is used in subsequent operations.

It is important that the dimensions of all the lines, or other markings engraved in the surface of such negatives, should remain the same over long periods of time so that the plate will continue to give accurate, uniform reproductions. As will be apparent, this highly advantageous result is of paramount importance in the production of such items as charts and maps—requiring a high degree of dimensional accuracy.

Now, I have discovered that if the plastic sheet of Vinylite, Mylar or the like used in the preparation of such plates be provided, prior to the application of the opaque surfacing material, with a substrata of the varnish-containing coating composition disclosed above, then, the engraved plastic plate will retain the desired dimensional stability over long periods of time during subsequent use. I have further discovered that when the aforesaid composition is used as an undercoating or substrata on Vinylite or other plastic negatives, the latter have improved engraving qualities. More particularly, the coating protects the Vinylite and the like from penetration by the engraving tool. This enables corrections, i.e. revisions to be made in the negative and reduces the original engraving time.

In the production of stabilized negatives in accordance with this invention, the liquid coating solution comprising a varnish, and preferably having the composition set out above and prepared in accordance with the procedure described, is either brushed on or is applied by a cloth onto the plastic plate which is to serve as negative, and which has been previously carefully cleaned with alcohol.

Alternatively, the surface of the plate can be dipped, or the liquid coating can be applied by pouring the liquid coating solution on the surface of the plate to be coated and removing the excess, as by wiping. The coating is allowed to set or dry for a period of time up to 48 hours, when it is ready for use.

The plate thus coated is then "stained" with any desirable commercial opaque surfacing material, which is applied in the usual or any convenient manner on top of the above finished substrata or undercoating. When dry, the plate is ready for use in the production of negatives.

While I have disclosed above the use of benzol and turpentine as the solvents in the preparation of my liquid coating composition, it should be understood that the invention is not limited to the use of these specific solvents and that other compatible solvents can be used.

I claim:

1. A dimensionally stabilized engraving plate consisting essentially of a plastic base, a top coating of an opaque surfacing material and an undercoating of a composition compatible with said surfacing material, said undercoating consisting essentially of the following ingredients in substantially the proportions indicated:

| | Parts by weight |
|---|---|
| Castor oil | 1 |
| Benzol | 2 |
| Beeswax | 2 |
| Turpentine (redistilled) | 48 |
| Spar varnish | 26 |

2. An improved liquid coating composition consisting essentially of the following ingredients:

| | Parts by weight |
|---|---|
| Castor oil | 1 |
| Benzol | 2 |
| Beeswax | 2 |
| Turpentine (redistilled) | 48 |
| Spar varnish | 26 |

3. In the method of dimensionally stabilizing sheet plastic material used for engraving purposes and comprising a coating of opaque surfacing material, the improvement consisting in the step of providing the sheet material with an undercoating of a composition as recited in claim 1, said composition being compatible with said opaque surfacing material.

References Cited in the file of this patent

UNITED STATES PATENTS

| | | |
|---|---|---|
| 86,672 | Hopson | Feb. 9, 1863 |
| 128,302 | Guichard | June 25, 1879 |
| 344,129 | Macrone | June 22, 1886 |
| 407,510 | Buncke | July 23, 1889 |
| 556,470 | Morris et al. | Mar. 17, 1896 |
| 732,514 | Brazell | June 30, 1903 |
| 767,499 | Pierce | Aug. 4, 1904 |
| 1,084,091 | Knoepfler | Jan. 13, 1914 |
| 1,459,581 | Draper | June 19, 1923 |
| 1,863,264 | Bradley | June 14, 1932 |
| 2,575,998 | Cooper | Nov. 20, 1951 |
| 2,695,895 | Barnard et al. | Nov. 30, 1954 |

UNITED STATES PATENT OFFICE

CERTIFICATE OF CORRECTION

Patent No. 2,942,995                  June 28, 1960

Nathan B. Hughes

It is hereby certified that error appears in the printed specification of the above numbered patent requiring correction and that the said Letters Patent should read as corrected below.

Column 1, line 24, for "presenting" read -- preserving --.

Signed and sealed this 8th day of November 1960.

(SEAL)
Attest:

KARL H. AXLINE                                ROBERT C. WATSON
Attesting Officer                               Commissioner of Patents